US012597602B2

(12) United States Patent
Lee et al.

(10) Patent No.: US 12,597,602 B2
(45) Date of Patent: Apr. 7, 2026

(54) LITHIUM AND MANGANESE RICH POSITIVE ACTIVE MATERIAL COMPOSITIONS

(71) Applicant: Ford Global Technologies, LLC, Dearborn, MI (US)

(72) Inventors: Eunsung Lee, Novi, MI (US); Chi Paik, Grosse Ile, MI (US); Robert J. Kudla, Canton, MI (US); Mary Fredrick, Carleton, MI (US); Jason Aaron Lupescu, Wayne, MI (US); Yisun Aaron Cheng, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 466 days.

(21) Appl. No.: 18/105,642

(22) Filed: Feb. 3, 2023

(65) Prior Publication Data

US 2024/0266523 A1     Aug. 8, 2024

(51) Int. Cl.
| | |
|---|---|
| *H01M 4/505* | (2010.01) |
| *C01G 53/50* | (2025.01) |
| *H01M 4/131* | (2010.01) |
| *H01M 4/525* | (2010.01) |
| *H01M 10/0525* | (2010.01) |
| *H01M 4/02* | (2006.01) |

(52) U.S. Cl.
CPC ............ *H01M 4/505* (2013.01); *C01G 53/50* (2013.01); *H01M 4/131* (2013.01); *H01M 4/525* (2013.01); *H01M 10/0525* (2013.01); *C01P 2006/40* (2013.01); *H01M 2004/028* (2013.01)

(58) Field of Classification Search
CPC ...... H01M 4/525; H01M 4/505; H01M 4/131; H01M 2004/028; H01M 10/0525; C01G 53/50
See application file for complete search history.

(56) References Cited

U.S. PATENT DOCUMENTS

| | | | |
|---|---|---|---|
| 7,368,071 | B2 | 5/2008 | Dahn et al. |
| 8,741,482 | B2 | 6/2014 | Park et al. |
| 9,324,994 | B2 | 4/2016 | Oh et al. |
| 10,283,771 | B2 | 5/2019 | Lee et al. |
| 10,333,135 | B2 | 6/2019 | Lee et al. |
| 10,483,539 | B2 | 11/2019 | Barton et al. |
| 10,573,884 | B2 | 2/2020 | Lee et al. |
| 10,640,391 | B2 | 5/2020 | Zhang et al. |
| 11,289,695 | B2 | 3/2022 | Han et al. |
| 11,329,284 | B2 | 5/2022 | Barton et al. |
| 12,347,849 | B2 | 7/2025 | Pietrasz et al. |
| 2003/0087154 | A1 | 5/2003 | Ohzuku et al. |
| 2004/0234857 | A1* | 11/2004 | Shiozaki ............... H01M 4/525 429/231.3 |
| 2013/0316241 | A1 | 11/2013 | Oh et al. |
| 2014/0234719 | A1 | 8/2014 | Christensen |
| 2015/0050522 | A1 | 2/2015 | Manthiram et al. |
| 2018/0159109 | A1 | 6/2018 | Tsubouchi et al. |
| 2019/0115590 | A1 | 4/2019 | Zhang et al. |
| 2022/0029149 | A1 | 1/2022 | Croy et al. |
| 2022/0246927 | A1 | 8/2022 | Barton et al. |
| 2024/0047665 | A1 | 2/2024 | Lee et al. |
| 2024/0162478 | A1 | 5/2024 | Park et al. |
| 2024/0266523 | A1 | 8/2024 | Lee et al. |
| 2024/0274809 | A1 | 8/2024 | Lee et al. |
| 2024/0274813 | A1 | 8/2024 | Lee et al. |
| 2024/0421292 | A1 | 12/2024 | Lee et al. |
| 2024/0421293 | A1 | 12/2024 | Lee et al. |
| 2025/0054961 | A1 | 2/2025 | Lee et al. |
| 2025/0054965 | A1 | 2/2025 | Lee et al. |
| 2025/0118727 | A1 | 4/2025 | Park et al. |
| 2025/0140825 | A1 | 5/2025 | Park et al. |
| 2025/0149571 | A1 | 5/2025 | Hur et al. |
| 2025/0192220 | A1 | 6/2025 | Park et al. |

FOREIGN PATENT DOCUMENTS

| | | | |
|---|---|---|---|
| ID | P202506921 | A | 5/2025 |
| JP | 6410737 | B2 | 10/2018 |
| JP | 2025517258 | A | 6/2025 |
| KR | 100801637 | B1 | 2/2008 |
| KR | 101139972 | B1 | 4/2012 |
| KR | 101252988 | B1 | 4/2013 |
| KR | 101274818 | B1 | 6/2013 |
| KR | 101297910 | B1 | 8/2013 |
| KR | 101310556 | B1 | 9/2013 |
| KR | 101355842 | B1 | 1/2014 |
| KR | 101414955 | B1 | 7/2014 |
| KR | 101444510 | B1 | 9/2014 |
| KR | 101451196 | B1 | 10/2014 |
| KR | 101452029 | B1 | 10/2014 |
| KR | 101452228 | B1 | 10/2014 |
| KR | 101475738 | B1 | 12/2014 |
| KR | 101515678 | B1 | 4/2015 |
| KR | 101520166 | B1 | 5/2015 |
| KR | 101520634 | B1 | 5/2015 |
| KR | 101551520 | B1 | 9/2015 |
| KR | 101551523 | B1 | 9/2015 |
| KR | 101564131 | B1 | 11/2015 |
| KR | 101584227 | B1 | 1/2016 |
| KR | 101595562 | B1 | 2/2016 |
| KR | 101650568 | B1 | 8/2016 |
| KR | 101702070 | B1 | 2/2017 |
| KR | 101787169 | B1 | 10/2017 |

(Continued)

*Primary Examiner* — Laura Weiner

(74) *Attorney, Agent, or Firm* — David B. Kelley; Brooks Kushman P.C.

(57) ABSTRACT

A positive electrode active material includes a compound represented by formula 1:

$$Li_{1.10}Mn_{0.52}Ni_{0.38-x}M_xO_2 \qquad (1)$$

wherein:
M is Co or Cr;
$2 < $ average oxidation state of Ni ion $< 2.15$; and
$0 < x < 0.06$.

14 Claims, 6 Drawing Sheets

(56)  References Cited

FOREIGN PATENT DOCUMENTS

| | | | |
|---|---|---|---|
| KR | 101804492 | B1 | 1/2018 |
| KR | 101812269 | B1 | 1/2018 |
| KR | 101865440 | B1 | 6/2018 |
| KR | 102010014 | B1 | 8/2019 |
| KR | 102010015 | B1 | 8/2019 |
| KR | 102500085 | B1 | 2/2023 |
| KR | 102560748 | B1 | 7/2023 |
| KR | 20230121686 | A | 8/2023 |
| KR | 102614091 | B1 | 12/2023 |
| KR | 102631719 | B1 | 1/2024 |
| KR | 20240010601 | A | 1/2024 |
| KR | 20240022933 | A | 2/2024 |
| KR | 20240037782 | A | 3/2024 |
| KR | 20240037783 | A | 3/2024 |
| KR | 20240037784 | A | 3/2024 |
| KR | 20240038508 | A | 3/2024 |
| KR | 20240048709 | A | 4/2024 |
| KR | 20240066590 | A | 5/2024 |
| KR | 20240097733 | A | 6/2024 |
| KR | 20240100160 | A | 7/2024 |
| KR | 20240101208 | A | 7/2024 |
| KR | 20240101228 | A | 7/2024 |
| KR | 20240101231 | A | 7/2024 |
| KR | 20240101236 | A | 7/2024 |
| KR | 20240101503 | A | 7/2024 |
| KR | 20240116401 | A | 7/2024 |
| KR | 20240131273 | A | 8/2024 |
| KR | 20240141621 | A | 9/2024 |
| KR | 102718839 | B1 | 10/2024 |
| KR | 20250005905 | A | 1/2025 |
| KR | 20250011606 | A | 1/2025 |
| KR | 20250012243 | A | 1/2025 |
| KR | 20250017149 | A | 2/2025 |
| KR | 20250019581 | A | 2/2025 |
| KR | 102779622 | B1 | 3/2025 |
| KR | 20250036028 | A | 3/2025 |
| KR | 20250041530 | A | 3/2025 |
| KR | 20250041531 | A | 3/2025 |
| KR | 102788465 | B1 | 4/2025 |
| KR | 102798542 | B1 | 4/2025 |
| KR | 20250060135 | A | 5/2025 |
| KR | 102821623 | B1 | 6/2025 |
| KR | 102824104 | B1 | 6/2025 |
| KR | 102824705 | B1 | 6/2025 |
| KR | 102824706 | B1 | 6/2025 |
| KR | 20250080473 | A | 6/2025 |
| KR | 20250098742 | A | 7/2025 |
| KR | 20250103509 | A | 7/2025 |
| WO | 2012044055 | A2 | 4/2012 |
| WO | 2024058440 | A1 | 3/2024 |
| WO | 2024058442 | A1 | 3/2024 |
| WO | 2024058444 | A1 | 3/2024 |
| WO | 2024096414 | A1 | 5/2024 |
| WO | 2024101750 | A1 | 5/2024 |
| WO | 2024136522 | A1 | 6/2024 |
| WO | 2024195981 | A1 | 9/2024 |
| WO | 2025033894 | A1 | 2/2025 |
| WO | 2025042066 | A1 | 2/2025 |
| WO | 2025042092 | A1 | 2/2025 |
| WO | 2025042163 | A1 | 2/2025 |
| WO | 2025048236 | A1 | 3/2025 |
| WO | 2025063675 | A1 | 3/2025 |
| WO | 2025080013 | A1 | 4/2025 |
| WO | 2025100781 | A1 | 5/2025 |

* cited by examiner

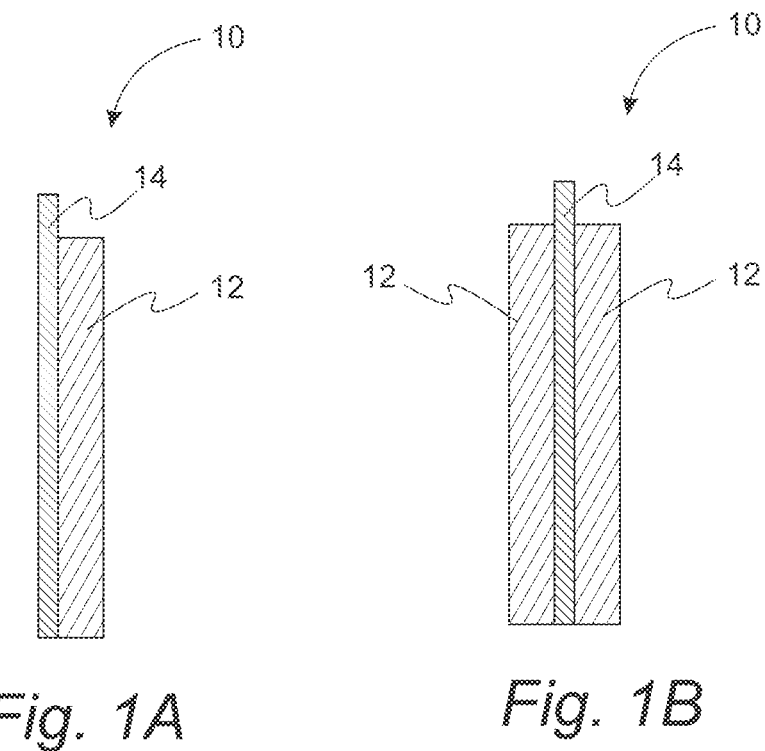
*Fig. 1A*          *Fig. 1B*
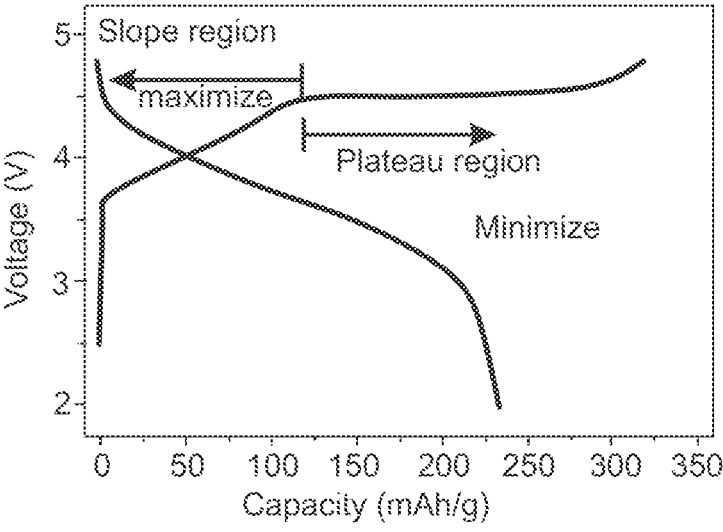
*Fig. 2*

LITHIUM AND MANGANESE RICH POSITIVE ACTIVE MATERIAL COMPOSITIONS

TECHNICAL FIELD

In at least one aspect, positive electrode active materials for lithium-ion batteries are provided.

BACKGROUND

Lithium and Manganese Rich (LMR) positive electrode active material has been considered one of the most promising next-generation cathode materials due to the highest gravimetric energy density (Mn-rich and low Ni and low Co) compared to currently used NCMs and NCAs. However, intrinsic issues of LMR such as voltage decay during cycling, rate capability, cycle performance, and volumetric energy density have prevented successful commercialization.

Accordingly, there is a need for positive electrode active materials for lithium-ion batteries with increased rate capability, cell performance, and volumetric energy density.

SUMMARY

In at least one aspect, a positive electrode active material is provided. The positive electrode active material includes a compound represented by formula 1:

$$Li_{1.10}Mn_{0.52}Ni_{0.38-x}M_xO_2 \tag{1}$$

wherein:
 M is Co or Cr;
 2<average oxidation state of Ni ion<2.15; and
 0<x<0.06.
In another aspect, a positive electrode for a lithium-ion battery is provided. The positive electrode includes a positive electrode active material that includes a compound represented by Chemical Formula 1:

$$Li_{1.10}Mn_{0.52}Ni_{0.38-x}M_xO_2 \tag{1}$$

wherein:
 M is Co or Cr:
 2<average oxidation state of Ni ion<2.15 and
 0<x<0.06.
In another aspect, a rechargeable lithium-ion battery including at least one lithium-ion battery cell is provided. Each lithium-ion battering cell includes a positive electrode comprising a compound represented by formula 1:

$$Li_{1.10}Mn_{0.52}Ni_{0.38-x}M_xO_2 \tag{1}$$

wherein:
 M is Co or Cr;
 2<average oxidation state of Ni ion<2.15; and
 0<x<0.06. Each electrode also includes a negative that includes a negative active material and an electrolyte contacting the positive electrode and the negative electrode.

Advantageously, this new LMR composition with lower Li content of 1.10 and less than 6% of Co can mitigate critical issues of LMR such as severe voltage decay during cycling, poor rate capability, poor cycle performance, and/or lower volumetric energy density.

In another aspect, the positive electrode materials provided herein minimized energy density decreases while mitigating other intrinsic issues such as voltage decay during cycling, poor rate compatibility, and poor cycle performance.

In another aspect, a positive electrode active material is provided. The positive electrode active material includes a compound represented by formula 2:

$$Li_aMn_bNi_{0.38-x}M_xO_2 \tag{2}$$

wherein:
 M is Co or Cr;
 1.09<a<1.15;
 0.48<b<0.54;
 2<average oxidation state of Ni ion<2.15; and
 0<x<0.06.
The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein:

FIG. 1A. Schematic cross-section of a positive electrode that includes cathode active material on a single side of a current collector.

FIG. 1B. Schematic cross-section of a positive electrode that includes cathode active material on both sides of a current collector.

FIG. 2. General plot of voltage versus capacity.

DETAILED DESCRIPTION

Figure 3:
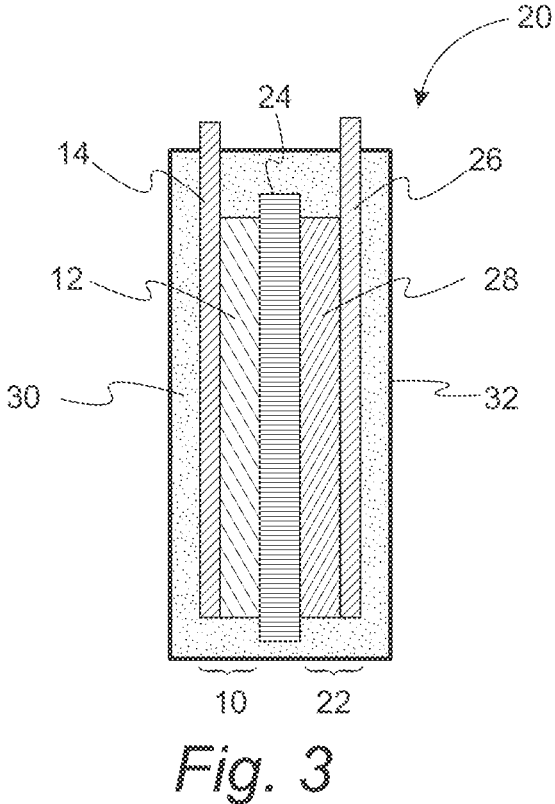
FIG. 3. Schematic cross-section of a battery cell that includes the positive electrode of FIG. 1A.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/–5% of the value. As one example, the phrase "about 100" denotes a range of 100+/–5, i.e. the range from 95 to 105. Generally, when the term "about" is used, it can be expected that similar results or effects according to the invention can be obtained within a range of +/–5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B"

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

The term "positive electrode" means a battery cell electrode from which current flows out when the lithium-ion battery cell or battery is discharged. Sometimes a "positive electrode" is referred to as a "cathode."

The term "negative electrode" means a battery cell electrode to which current flows in when the lithium-ion battery cell is discharged. Sometimes a "negative electrode" is referred to as an "anode."

The term "cell" or "battery cell" means an electrochemical cell made of at least one positive electrode, at least one negative electrode, an electrolyte, and a separator membrane.

The term "battery" or "battery pack" means an electric storage device made of at least one battery cell. In a refinement, "battery" or "battery pack" is an electric storage device made of a plurality of battery cells.

The term "specific capacity" means the capacity per unit mass of the anode active. Specific capacity has units of milliamp hours/gram (mAh/g).

Abbreviations

"BEV" means battery electric vehicle.
"LMR" means lithium and manganese-rich.
"mAh" means milliamp-hour.

"mAh/g" means milliamp-hour per gram.

Referring to FIGS. 1A and 1B, a schematic of a positive electrode that includes a positive electrode active material is provided. Positive electrode 10 includes positive electrode active material layer 12 of positive electrode active material disposed over and typically contacting positive electrode current collector 14. Typically, positive electrode current collector 14 is a metal plate or metal foil composed of a metal such as aluminum, copper, platinum, zinc, titanium, and the like. Currently, aluminum is most commonly used for the positive electrode current collector. The positive electrode active material is represented by formula 1:

$$Li_{1.10}Mn_{0.52}Ni_{0.38-x}M_xO_2 \tag{1}$$

wherein:

M is Co or Cr;

2<average oxidation state of Ni ion<2.15; and

0<x<0.06. FIG. 1A shows a positive electrode that includes cathode active material on a single side of a current collector while FIG. 1B shows a positive electrode that includes cathode active material on both sides of a current collector.

In a variation, the positive electrode active material is represented by formula 2:

$$Li_aMn_bNi_{0.38-x}M_xO_2 \tag{2}$$

wherein:

M is Co or Cr;

1.09<a<1.15;

0.48<b<0.54;

2<average oxidation state of Ni ion<2.15; and

0<x<0.06.

In a variation, x is from 0.001 to 0.055. In a refinement, x is at least in increasing order of preference 0, 0.001, 0.01, 0.02, 0.03, or 0.04 and at most in increasing order of preference, 0.07, 0.06, 0.055, or 0.05.

In a variation, the average oxidation state (i.e., oxidation number) of Ni ions is from 2.04 to 2.25. In a refinement, the average oxidation state of Ni ions is at least in increasing order of preference 2, 2.04, 2.07, 2.10, or 2.13 and at most in increasing order of preference, 2.27, 2.25, 2.23, 2.21, or 2.19.

FIG. 2 provides a general plot of voltage versus capacity. In general, it is desirable to maximize the slope region and minimize the plateau region. A maximized slope region can be obtained by applying small Li content of 1.10 and with small amount of o for better electrical conductivity. A minimized plateau region can suppress voltage decay.

In another variation, the positive electrode material of formula 1 has an average oxidation state of Mn ions of about 4 (+/−5%, e.g., 3.8 to 4.2). Specific positive electrode active materials are provided in Table 1.

TABLE 1

| Positive electrode materials | | | |
|---|---|---|---|
| Composition | Theoretical capacity in the slope region | Ave. oxidation state of Mn ion | Ave. oxidation state of Ni ion |
| $Li_{1.10}Mn_{0.52}Ni_{0.32}Co_{0.06}O_2$ | 207.7 | 4 | 2.00 |
| $Li_{1.10}Mn_{0.52}Ni_{0.33}Co_{0.05}O_2$ | | | 2.03 |
| $Li_{1.10}Mn_{0.52}Ni_{0.34}Co_{0.04}O_2$ | | | 2.06 |
| $Li_{1.10}Mn_{0.52}Ni_{0.35}Co_{0.03}O_2$ | | | 2.08 |

TABLE 1-continued

| Positive electrode materials | | | |
|---|---|---|---|
| Composition | Theoretical capacity in the slope region | Ave. oxidation state of Mn ion | Ave. oxidation state of Ni ion |
| $Li_{1.10}Mn_{0.52}Ni_{0.36}Co_{0.02}O_2$ | | | 2.11 |
| $Li_{1.10}Mn_{0.52}Ni_{0.37}Co_{0.01}O_2$, | | | 2.13 |
| $Li_{1.10}Mn_{0.52}Ni_{0.38}Co_{0.0}O_2$ | | | 2.15 |

It is noteworthy that these materials have a theoretical capacity in the slope region of the plot of voltage versus capacity (mAh/g) of about 207 mAh/g with an average oxidation state of Mn ions of about 4.

With reference to FIG. 3, a schematic of a rechargeable lithium-ion battery cell incorporating the positive electrode of FIG. 1 is provided. Battery cell 20 includes positive electrode 10 as described above, negative electrode 22, and separator 24 interposed between the positive electrode and the negative electrode. Negative electrode 22 includes an negative electrode current collector 26 and a negative active material layer 28 disposed over and typically contacting the negative current collector. Typically, negative electrode current collector 26 is a metal plate or metal foil composed of a metal such as aluminum, copper, platinum, zinc, titanium, and the like. Currently, copper is most commonly used for the negative electrode current collector. The battery cell is immersed in electrolyte 30 which is enclosed by battery cell case 32. Electrolyte 30 imbibes into separator 24. In other words, the separator 24 includes the electrolyte thereby allowing lithium ions to move between the negative and positive electrodes. The electrolyte includes a non-aqueous organic solvent and a lithium salt. The non-aqueous organic solvent serves as a medium for transmitting ions taking part in the electrochemical reaction of a battery. Advantageously, battery cell 20 can have a specific capacity of greater than 150 mAh/g. In a refinement, battery cell 20 has specific capacity greater than 190 mAh/g and typically, less than 250 mAh/g.

Figure 4:
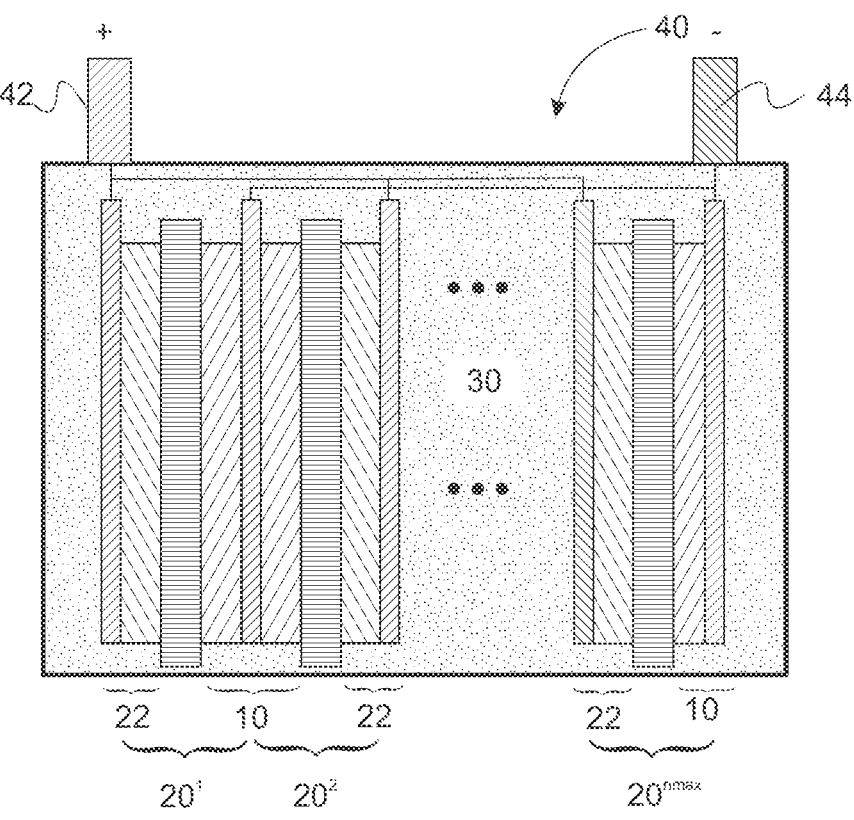
FIG. 4. Schematic cross-section of a battery pack that includes the battery cells of FIG. 2.

With reference to FIG. 4, a schematic of a rechargeable lithium-ion battery incorporating the positive electrode of FIG. 1 and the battery cells of FIG. 3 is provided. Rechargeable lithium-ion battery 40 includes at least one battery cell of the design in FIG. 3. Typically, comprising rechargeable lithium-ion battery 40 includes at least one battery cell 201 of the design of FIG. 3. Each lithium-ion battery cell 201 includes a positive electrode 10 which includes the compound represented by formula 1, a negative electrode 22 which includes a negative active material, and an electrolyte 30, where i is an integer label for each battery cell. The label i runs from 1 to nmax, where nmax is the total number of battery cells in rechargeable lithium-ion battery 40. The electrolyte 30 includes a non-aqueous organic solvent and a lithium salt. The non-aqueous organic solvent serves as a medium for transmitting ions taking part in the electrochemical reaction of a battery. The plurality of battery cells can be wired in series, in parallel, or a combination thereof. The voltage output from battery 40 is provided across terminals 42 and 44. Advantageously, rechargeable lithium-ion battery 40 can have a specific capacity of greater than 150 mAh/g for each battery cell therein.

Referring to FIGS. 3 and 4, separator 24 physically separates the negative electrode 22 from the positive electrode 10 thereby presenting shorting while allowing the transport of lithium ions for charging and discharging. Therefore, separator 24 can be composed of any material suitable for this purpose. Examples of suitable materials from which separator 24 can be composed include but are not limited to, polytetrafluoroethylene (e.g., TEFLON®), glass fiber, polyester, polyethylene, polypropylene, and combinations thereof. Separator 24 can be in the form of either a woven or non-woven fabric. Separator 24 can be in the form of a non-woven fabric or a woven fabric. For example, a polyolefin-based polymer separator such as poly-ethylene and/or polypropylene is typically used for a lithium-ion battery. In order to ensure heat resistance or mechanical strength, a coated separator includes a coating of ceramic or a polymer material may be used.

Referring to FIGS. 3 and 4, electrolyte 30 includes a lithium salt dissolved in the non-aqueous organic solvent. Therefore, electrolyte 30 includes lithium ions that can intercalate into the positive electrode active material during charging and into the anode active material during discharging. Examples of lithium salts include but are not limited to LiPF$_6$, LiBF$_4$, LiSbF$_6$, LiAsF$_6$, LiC$_4$F$_9$SO$_3$, LiClO$_4$, LiAlO$_2$, LiAlCl$_4$, LiCl, LiI, LiB(C$_2$O4)$_2$, and combinations thereof. In a refinement, the electrolyte includes the lithium salt in an amount from about 0.1 M to about 2.0 M.

Still referring to FIGS. 3 and 4, the electrolyte includes a non-aqueous organic solvent and a lithium salt. Advantageously, the non-aqueous organic solvent serves as a medium for transmitting ions, and in particular, lithium ions participate in the electrochemical reaction of a battery. Suitable non-aqueous organic solvents include carbonate-based solvents, ester-based solvents, ether-based solvents, ketone-based solvents, alcohol-based solvents, aprotic solvents, and combinations thereof. Examples of carbonate-based solvents include but are not limited to dimethyl carbonate, diethyl carbonate, dipropyl carbonate, methyl-propyl carbonate, ethylpropyl carbonate, methylethyl carbonate, ethylene carbonate, propylene carbonate, butylene carbonate, and combinations thereof. Examples of ester-based solvents include but are not limited to methyl acetate, ethyl acetate, n-propyl acetate, methylpropionate, ethylpropionate, γ-butyrolactone, decanolide, valerolactone, mevalonolactone, caprolactone, and combinations thereof. Examples of ether-based solvents include but are not limited to dibutyl ether, tetraglyme, diglyme, dimethoxyethane, 2-methyltetrahydrofuran, tetrahydrofuran, and the like, and the ketone-based solvent may include cyclohexanone, and the like. Examples of alcohol-based solvent include but are not limited to methanol, ethyl alcohol, n-propyl alcohol, isopropyl alcohol, and the like. Examples of the aprotic solvent include but are not limited to nitriles such as R—CN (where R is a C$_{2\text{-}20}$ linear, branched, or cyclic hydrocarbon that may include a double bond, an aromatic ring, or an ether bond), amides such as dimethylformamide, dioxolanes such as 1,3-dioxolane, sulfolanes, and the like. Advantageously, the non-aqueous organic solvent can be used singularly. In other variations, mixtures of the non-aqueous organic solvent can be used. Such mixtures are typically formulated to optimize battery performance. In a refinement, a carbonate-based solvent is prepared by mixing a cyclic carbonate and a linear carbonate. In a variation, electrolyte 30 can further include vinylene carbonate or an ethylene carbonate-based compound to increase e battery cycle life.

Referring to FIGS. 1, 3, and 4, the negative electrode and the positive electrode can be fabricated by methods known to those skilled in the art of lithium-ion batteries. Typically, an active material (e.g., the positive o negative active material) is mixed with a conductive material, and a binder in a solvent (e.g., N-methylpyrrolidone) into an active material composition and coating the composition on a current collector. The electrode manufacturing method is well known and thus is not described in detail in the present specification. The solvent includes N-methylpyrrolidone and the like but is not limited thereto.

Referring to FIGS. 1, 3, and 4, the positive electrode active material layer 12 includes the positive electrode active material represented by formula 1, a binder, and a conductive material. The binder can increase the binding properties of positive electrode active material particles with one another and with the positive electrode current collector 14. Examples of suitable binders include but are not limited to polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylate styrene-butadiene rubber, an epoxy resin, nylon, and the like, and combinations thereof. The conductive material provides positive electrode 10 with electrical conductivity. Examples of suitable electrically conductive materials include but are not limited to natural graphite, artificial graphite, carbon black, acetylene black, ketjen black, carbon fibers, copper, metal powders, metal fibers, and combinations thereof. Examples of metal powders and metal fibers are composed of including nickel, aluminum, silver, and the like.

Referring to FIGS. 1, 3, and 4, the negative active material layer 26 includes a negative active material, includes a binder, and optionally a conductive material. The negative active materials used herein can be those negative materials known to one skilled in the art of lithium-ion batteries. Negative active materials include but are not limited to, carbon-based negative active materials, silicon-based negative active materials, and combinations thereof. A suitable carbon-based negative active material may include graphite and graphene. A suitable silicon-based negative active material may include at least one selected from silicon, silicon oxide, silicon oxide coated with conductive carbon on the surface, and silicon (Si) coated with conductive carbon on the surface. For example, silicon oxide can be described by the formula SiO$_z$, where z is from 0.09 to 1.1. Mixtures of carbon-based negative active materials, silicon-based negative active materials can also be used for the negative active material.

The negative electrode binder increases the binding properties of negative active material particles with one another and with a current collector. The binder can be a non-aqueous binder, an aqueous binder, or a combination thereof. Examples of non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. Aqueous binders can be rubber-based binders or polymer resin binders. Examples of rubber-based binders include but are not limited to styrene-butadiene rubbers, acrylated styrene-butadiene rubbers, acrylonitrile-butadiene rubbers, acrylic rubbers, butyl rubbers, fluorine rubbers, and combinations thereof. Examples of polymer resin binders include but are not limited to polyethylene, polypropylene, ethylenepropylene copolymer, polyethyleneoxide, polyvinylpyrrolidone, epichlorohydrin, polyphosphazene, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol and combinations thereof.

The following examples illustrate the various embodiments of the present invention. Those skilled in the art will recognize many variations that are within the spirit of the present invention and scope of the claims.

Table 2 provides positive electrode compositions for a commercially available positive electrode material and examples of the present invention.

TABLE 2

Positive electrode compositions.

| | Composition | Theoretical capacity in the slope region | Ave. oxidation state of Mn ion | Ave. oxidation state of Ni ion |
|---|---|---|---|---|
| Commerical sample | $Li_{1.14}Mn_{0.56}Ni_{0.30}O_2$ | 176.3 | 4 | 2.07 |
| Inventive sample # 1 | $Li_{1.10}Mn_{0.52}Ni_{0.35}Co_{0.04}O_2$ | 207.7 | 4 | 2.06 |
| Inventive sample # 1 | $Li_{1.10}Mn_{0.52}Ni_{0.35}Co_{0.03}O_2$ | | | 2.08 |
| Inventive sample # 1 | $Li_{1.10}Mn_{0.52}Ni_{0.36}Co_{0.02}O_2$ | | | 2.11 |

Figure 5A:
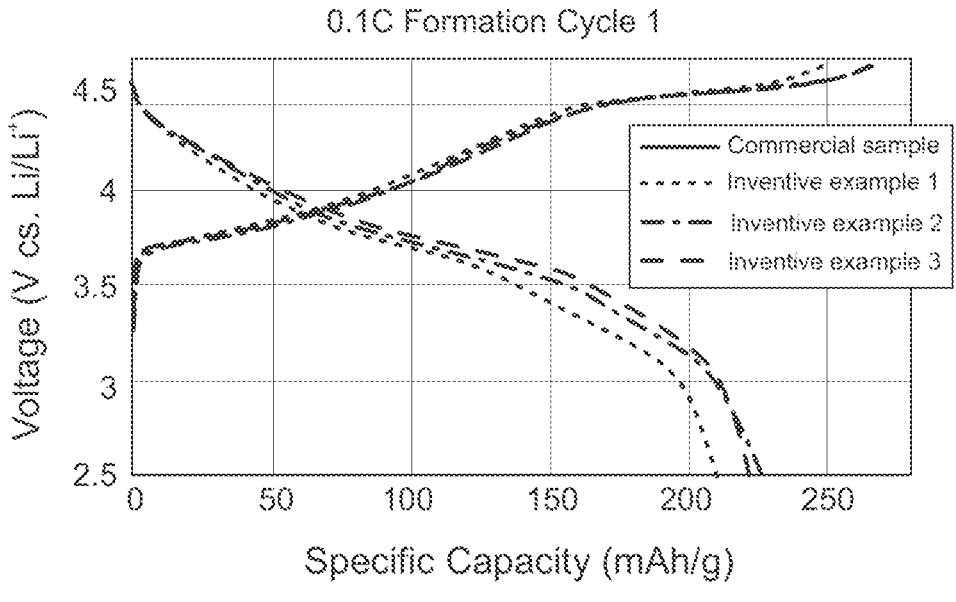
FIGS. 5A and 5B. Plots of voltage versus specific capacity for 0.1 C formation cycles.
Figure 5B:
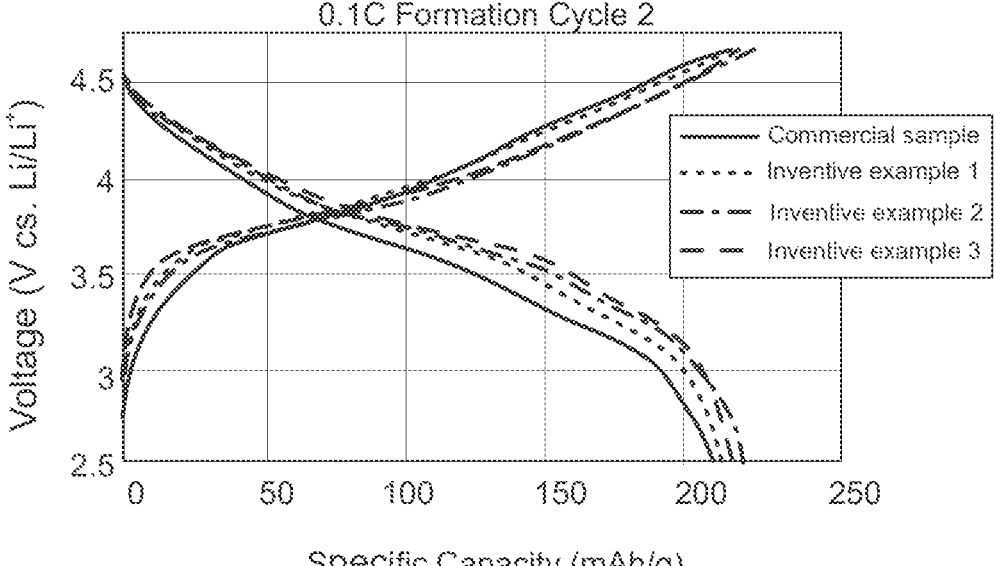
Figure 6A:
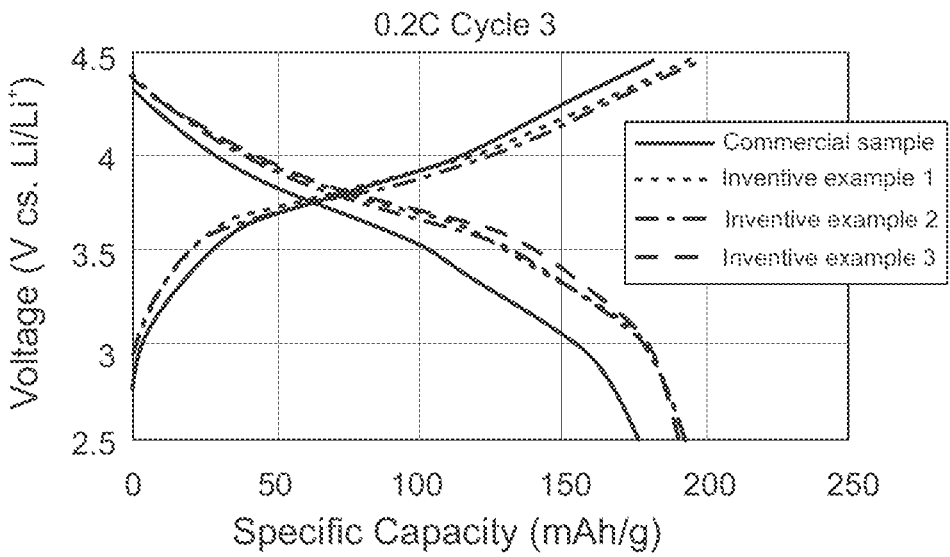
FIGS. 6A and 6B. Plots of voltage versus specific capacity for 0.2 C formation cycles.
Figure 6B:
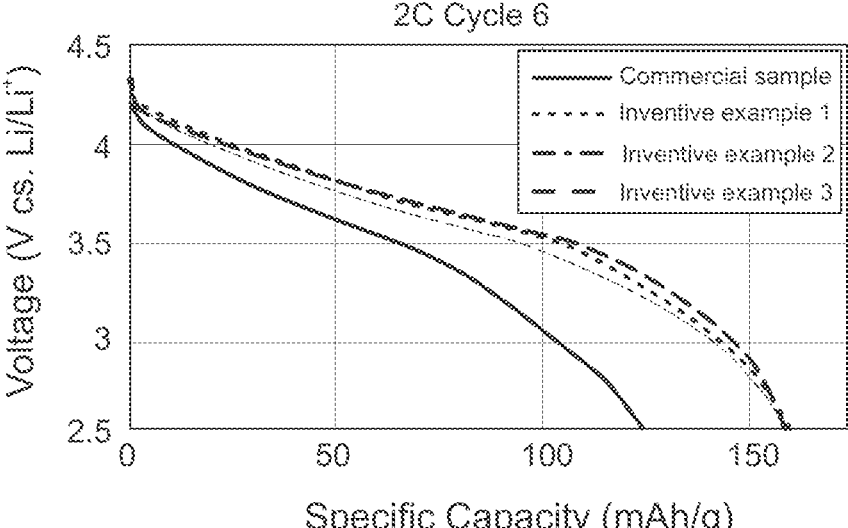
Figure 7A:
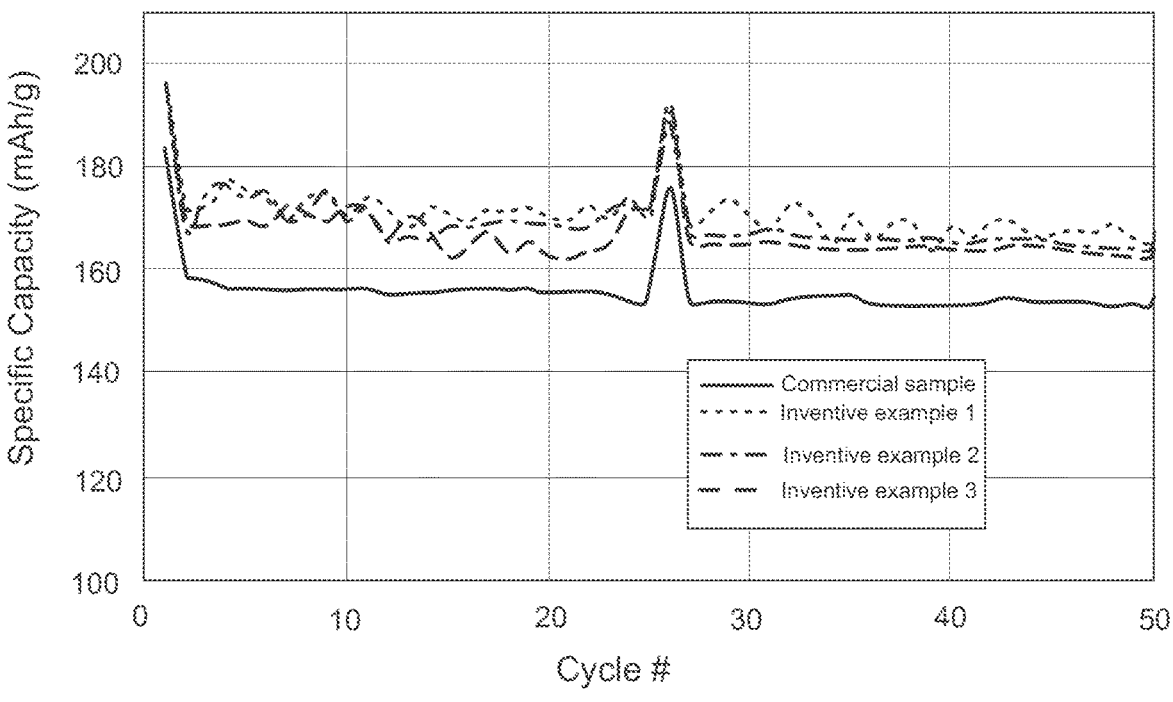
FIGS. 7A and 7B. Specific discharge capacity (A) and average discharge capacity (B) as a function of charging cycles.
Figure 7B:
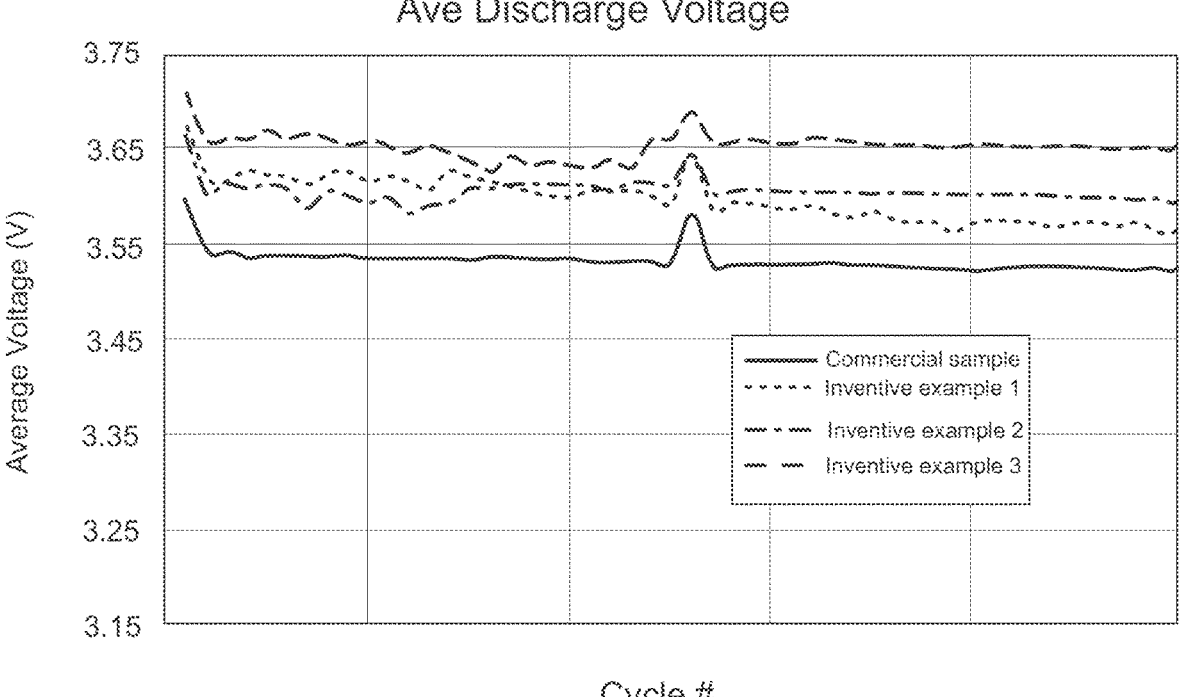

FIGS. 5A and 5B provide plots of voltage versus specific capacity for 0.1 C formation cycles. From these figures, it is observed that the positive electrode material of formula 1 shows higher capacity and higher average voltage than the commercial sample. Similarly, FIGS. 6A and 6B provide plots of voltage versus specific capacity for 0.2 C formation cycles. From these figures, it is observed that the positive electrode material of formula 1 shows higher rate capacity than the commercial sample. FIGS. 7A and 7B provide specific discharge capacity and average discharge capacity as a function of charging cycles. From these figures, it is observed that the positive electrode material of formula 1 shows good cycle performance and lower voltage decay than the commercial sample. Table 3 and 4 summarize the comparative cell perfance data.

TABLE 3

Cell performance results.

| | 0.2 C capacity | | |
|---|---|---|---|
| | Charge mAh/g | Discharge mAh/g | Efficiency % |
| Commercial sample | 182.2 | 176.2 | 96.7 |
| Inventive sample # 1 | 194.2 | 192.1 | 98.9 |
| Inventive sample # 2 | 198.7 | 193.2 | 97.3 |
| Inventive sample # 3 | 197.1 | 191.9 | 97.3 |

TABLE 4

Cell performance results.

| | Rate Capability | | | | | | | | Average |
|---|---|---|---|---|---|---|---|---|---|
| | 0.2 C | 0.5 C | 1 C | 2 C | 0.2 C | 0.5 C | 1 C | 2 C | Voltage |
| | mAh/g | | | | % of 0.2 C | | | | 0.2 C Cycle 3 |
| Commercial sample | 176.2 | 163.6 | 149.7 | 131.1 | 100 | 92.8 | 85.0 | 74.4 | 3.553 |
| Inventive sample # 1 | 192.1 | 182.9 | 174.1 | 160.7 | 100 | 95.2 | 90.6 | 83.7 | 3.657 |
| Inventive sample # 2 | 193.2 | 182.7 | 174.3 | 161.8 | 100 | 94.5 | 90.2 | 83.7 | 3.648 |
| Inventive sample # 3 | 191.9 | 181.0 | 172.0 | 161.3 | 100 | 94.3 | 89.6 | 84.1 | 3.692 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A positive electrode active material comprising a compound represented by formula 1:

$$Li_{1.10}Mn_{0.52}Ni_{0.38-x}M_xO_2 \qquad (1)$$

wherein:

M is Co or Cr;

2<average oxidation state of Ni ion<2.15; and

0<x<0.06.

2. The positive electrode active material of claim 1, wherein 0.001<x<0.055.

3. The positive electrode active material of claim 1, wherein 2.04<oxidation state<2.25.

4. The positive electrode active material of claim 1 including a material selected from the group consisting of $Li_{1.10}Mn_{0.52}Ni_{0.33}CO_{0.05}O_2$, $Li_{1.10}Mn_{0.52}Ni_{0.35}CO_{0.03}O_2$, $Li_{1.10}Mn_{0.52}Ni_{0.36}CO_{0.02}O_2$, and $Li_{1.10}Mn_{0.52}Ni_{0.37}CO_{0.01}O_2$.

5. The positive electrode active material of claim 1, wherein the Mn has an average oxidation state of about 4.

6. The positive electrode active material of claim 1, wherein M is Co.

7. A rechargeable lithium-ion battery comprising at least one lithium-ion battery cell, each lithium-ion battery cell including:

a positive electrode comprising a compound represented by formula 1:

$$Li_{1.10}Mn_{0.52}Ni_{0.38-x}M_xO_2 \qquad (1)$$

wherein:

M is Co or Cr;

2<average oxidation state of Ni ion<2.15;

0<x<0.06; and a negative electrode including a negative active material; and an electrolyte contacting the positive electrode and the negative electrode.

8. The rechargeable lithium-ion battery of claim 7, wherein 0.001<x<0.055.

9. The rechargeable lithium-ion battery of claim 7, wherein 2.00<oxidation state<2.15.

10. The rechargeable lithium-ion battery of claim 7 includes a material selected from the group consisting of $Li_{1.10}Mn_{0.52}Ni_{0.33}CO_{0.05}O_2$, $Li_{1.10}Mn_{0.52}Ni_{0.35}CO_{0.03}O_2$, $Li_{1.10}Mn_{0.52}Ni_{0.36}CO_{0.02}O_2$, and $Li_{1.10}Mn_{0.52}Ni_{0.37}CO_{0.01}O_2$.

11. The rechargeable lithium-ion battery of claim 10, wherein each battery cell has a specific capacity greater than 150 mAh/g and less than 250 mAh/g.

12. The rechargeable lithium-ion battery of claim 10, wherein M is Co.

13. The rechargeable lithium-ion battery of claim 7, wherein each battery cell further includes a separator interposed between the positive electrode and the negative electrode.

14. The rechargeable lithium-ion battery of claim 7, wherein the Mn has an average oxidation state of about 4.

*     *     *     *     *